April 16, 1968  W. P. CROCKER  3,378,296
VEHICLE BUMPER CUSHION
Filed June 21, 1965
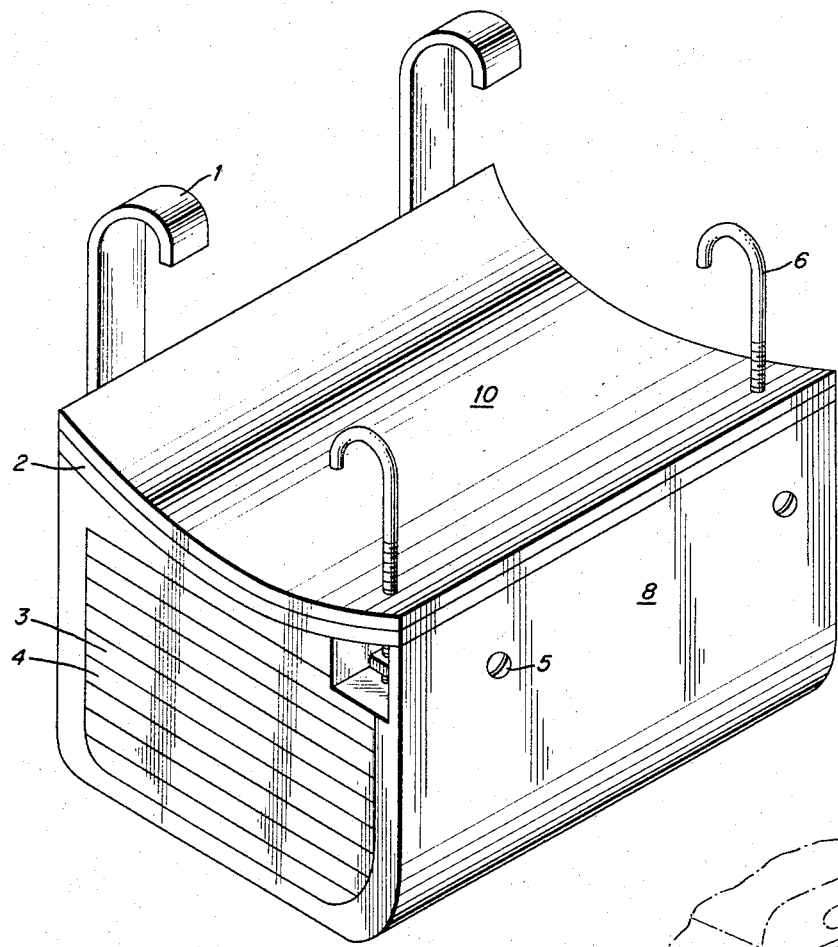
FIG. 1.
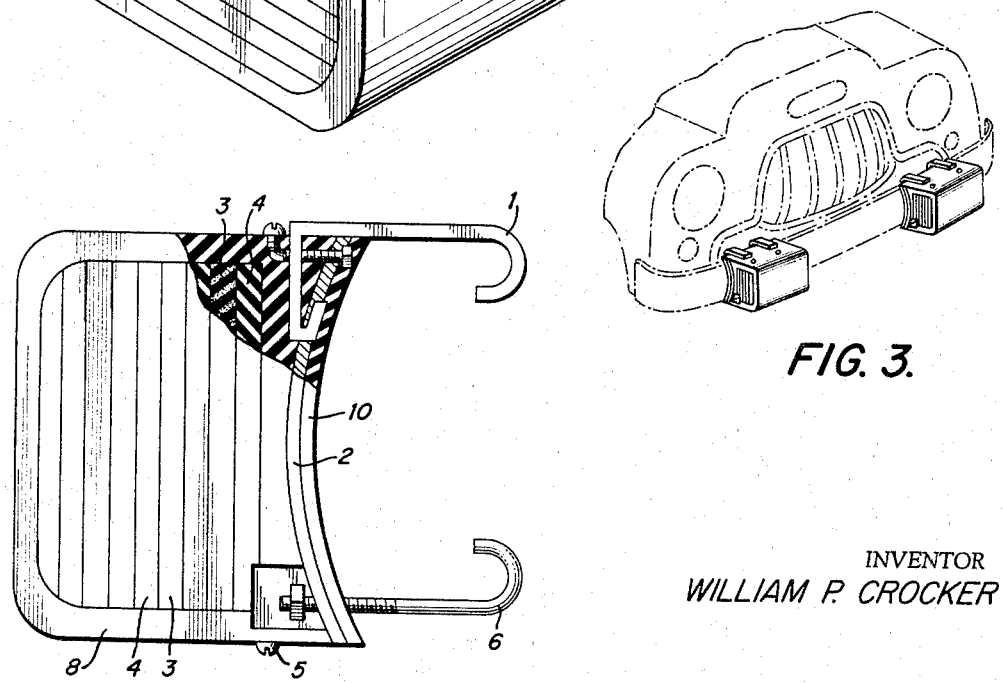
FIG. 2.
FIG. 3.
INVENTOR
WILLIAM P. CROCKER

United States Patent Office 3,378,296
Patented Apr. 16, 1968

3,378,296
VEHICLE BUMPER CUSHION
William P. Crocker, Carroll County, Tenn.
(Rte. 2, Box 53A, Trezevant, Tenn. 38258)
Filed June 21, 1965, Ser. No. 465,639
1 Claim. (Cl. 293—71)

ABSTRACT OF THE DISCLOSURE

An impact absorber including a cap of hard rubber encasing a plurality of alternating layers of hard rubber and foam rubber, and hook members for securing the cap to the vehicle bumper.

Background of the invention

This invention relates to a vehicle safety device, and more particularly to an impact absorber adapted to be attached to a vehicle bumper.

Although practically all motor vehicles are provided with bumpers, nevertheless these bumpers are usually provided with expensive chrome surfaces which not only are easily marred and dented upon impact but also do not absorb a sufficient amount of shock upon high impact.

Summary of the invention

It is an object of this invention to provide an impact absorber for mounting on an automobile bumper in order to absorb the shock of an impact from another vehicle striking the vehicle bumper, and also for providing a means for pushing a vehicle upon whose bumper the impact absorber is mounted, in order to prevent scratches, dents and marred places on the chrome or other metal surface of the bumper.

Another object of this invention is to provide a vehicle bumper impact absorber which will minimize damage to the vehicle from collisions, even at high speeds, and will consequently minimize the cost of such damages.

It is another object of the present invention to provide a device for traffic safety which can be readily placed on any motor vehicle and greatly reduce automobile wrecks, providing both greater safety for the passenger and greater protection against vehicle damage, without hampering the looks and stability of the vehicle.

Another object of the present invention is to provide a bumper impact absorber that is attractive in appearance, and economical.

Still a further object of the invention is to provide a car bumper impact absorber which can be produced, packaged and sold in large quantities at a comparatively low cost, and which can be conveniently utilized whenever needed.

Brief description of the drawings

FIG. 1 is a bottom, rear perspective view of the invention;

FIG. 2 is a left end elevation of the invention disclosed in FIG. 1, with portions broken away; and FIG. 3 is a perspective view of a pair of the impact absorbers disclosed in FIG. 1, but on a reduced scale, mounted on the front bumper of an automobile, disclosed in phantom.

Referring now more specifically to the drawings, a vehicle bumper impact absorber made in accordance with the present invention is shown to include a steel base plate 2.

Layers of foam rubber 3 and hard rubber 4 are alternately positioned upon and are substantially parallel to the front face of the steel plate 2 to project forwardly. A hard rubber cap 8 having a substantially arcuate cross-section in the plane of the width of the plate 2, which would be a vertical plane when assembled upon the bumper, fits completely around and in contact with the alternating layers of foam rubber 3 and hard rubber 4. The rear edges of the cap 8 are secured to the plate 2, by any convenient means, such as the four small bolts extending through each of the corresponding corners of the cap 8 and the plate 2. Thus, the cap 8 and the plate 2 form a substantially completely enclosed space or capsule filled by the alternating layers of foam rubber 3 and hard rubber 4.

A pair of upper hook-shaped clamps 1 are swivelly mounted to the top edge of the plate 2 so that the clamps 1 may be raised and lowered to facilitate catching the hooked ends of the clamps 1 over the top edge of the vehicle bumper to which the absorber is mounted. The upper clamps 1 may extend through corresponding slots cut into the steel plate 2.

Hook bolts 6 are slidably connected to the bottom edge of the plate 2 and provided with hooked ends for engaging over the bottom edge of the vehicle bumper. The opposite ends of the hook bolts 6 are threaded to receive taps or nuts, so that when the taps are tightened, the hook bolts 6 will draw the absorber into tight engagement against the bumper, assuming of course, that the hook clamps 1 also engage the top edge of the bumper. The hook bolts 6 are slidably mounted through corresponding holes in each bottom corner of the plate 2.

A padding or cover 10 made of heavy rubber material may be placed against the back surface of the plate 2 to protect the vehicle bumper from scarring or damage by the steel plate 2 when the absorber is mounted upon the plate. The base plate 2 may also be curved in a vertical plane to better fit the conventional curved surface of a vehicle bumper, if desired.

A metal or steel base plate 2 is preferably approximately the width of the vehicle bumper upon which the absorber is to be mounted, and may be about eight inches long and project forwardly from the bumper about five or six inches.

The hard rubber layer 4 and the hard rubber cap 2 may be made from the same rubber material, such as from an old automobile tire.

A crude model of the impact absorber has been actually made and tested for operativeness with very satisfactory results. Such tests included gliding an automobile upon whose front bumper the absorber was mounted, into a tree. Moreover, the same vehicle was driven to cause the impact absorber to collide with a truck bumper. Both tests resulted in a minimum of sound, and a soft, cushioned impact. An impact absorber made in accordance with this invention lends itself to an attractive and decorative appearance to the vehicle upon which it is mounted, as well as affording protection of the vehicle passengers. For the best protection, as well as appearance, two absorbers should be mounted upon each bumper. Moreover, impact abosrbers mounted adjacent the ends of the front bumper should also be provided with outwardly extending side strips that fit around the ends of the bumper to provide extra protection from side swipes.

Since the length of each absorber is very limited, with respect to the total length of the bumper, and only slightly greater than its width, the use of these absorbers in sets of at least two provide many advantages. First of all, only a small portion of the bmumper is covered, so that its attractive appearance is not materially altered. Moreover, a set of two small absorbers made in accordance with this invention would be considerably less expensive, because of the smaller quantity of materials required, than a bumper guard or absorber which extends the full length of the bumper. Moreover, a pair of short absorbers made in accordance with this invention are much easier to handle by the operator of the vehicle when they are installed or removed from the bumper, and also require less space in both transportation and storage, when handled by the distributor.

Having thus completely and fully described the invention what is now claimed as new and desired to be protected is:

1. An impact absorber for a vehicle bumper having a length and a width comprising:
   (a) a base plate substantially the same width of a bumper to which said absorber is to be secured and having a length less than twice said width, said base plate having a front face and a rear face;
   (b) a cap of hard rubber of substantially the same length and width as said base plate, secured to the edges of said base plate and having an arcuate cross-section in the plane of the width of said base plate, said cap having a convex outer surface and a concave inner surface opposing and spaced from said front face;
   (c) a plurality of layers of hard rubber within the space between said base plate and said cap and disposed substantially parallel to said base plate;
   (d) a plurality of layers of foam rubber within the space between said base plate and said cap, said layers of foam rubber alternating with said layers of hard rubber, so that each of said hard rubber layers is located between and engages an adjacent pair of foam rubber layers;
   (e) at least one hook-shaped clamp mounted along one longitudinal edge of said base plate for engagement over the top of a bumper; and
   (f) at least one hook bolt slidably connected to the opposite longitudinal edge of said base plate having a hooked end for engaging over the bottom edge of said vehicle bumper and for drawing said base plate toward and against said bumper.

References Cited

UNITED STATES PATENTS

| | | | |
|---|---|---|---|
| 1,313,282 | 8/1919 | Finnegan | 293—71 |
| 1,348,030 | 7/1920 | Millard | 293—71 |
| 1,402,324 | 1/1922 | Van Gelder | 293—71 |
| 2,271,046 | 1/1946 | Sing | 293—71 |
| 2,730,396 | 1/1956 | Johnson | 293—71 |
| 2,731,289 | 1/1956 | Corydon | 293—71 X |
| 3,058,738 | 10/1962 | Corson et al. | 114—219 |
| 3,216,593 | 11/1965 | Reuter et al. | 267—1 X |
| 1,417,008 | 5/1922 | Williams | 152—323 X |
| 1,727,982 | 9/1929 | Jacobs | 293—71 |
| 1,768,348 | 6/1930 | Wescott | 152—323 X |
| 1,834,824 | 12/1931 | Brown | 293—71 |
| 2,709,471 | 5/1955 | Smith et al. | 152—323 X |

ARTHUR L. LA POINT, *Primary Examiner.*

H. BELTRAN, *Assistant Examiner.*